United States Patent [19]

Deike

[11] Patent Number: 4,645,084

[45] Date of Patent: Feb. 24, 1987

[54] ROBOT ARM

[75] Inventor: Robert F. Deike, Cheyenne, Wyo.

[73] Assignee: Construction Robotics, Inc., Chicago, Ill.

[21] Appl. No.: 704,047

[22] Filed: Feb. 21, 1985

[51] Int. Cl.$^4$ ............................................. E21C 5/00
[52] U.S. Cl. ..................................... 212/271; 173/43; 901/22
[58] Field of Search ...................... 212/238, 261, 270; 901/22; 248/654; 173/22, 28, 38, 43, 141, 152, 160

[56] References Cited

U.S. PATENT DOCUMENTS

| | | | |
|---|---|---|---|
| 3,268,092 | 8/1966 | Hainer et al. | 212/179 |
| 3,881,556 | 5/1975 | Cresp | 173/43 |
| 4,050,526 | 9/1977 | Deike | 173/27 |
| 4,124,081 | 11/1978 | Deike | 173/28 |
| 4,130,168 | 12/1978 | Deike | 173/38 |
| 4,300,198 | 11/1981 | Davini | 901/22 |
| 4,364,540 | 12/1982 | Montabert | 173/43 |
| 4,378,959 | 4/1983 | Susnjara | 901/22 |
| 4,601,000 | 7/1986 | Montabert | 901/22 |

FOREIGN PATENT DOCUMENTS

1381766 11/1964 France .................. 212/271

Primary Examiner—Galen Barefoot
Assistant Examiner—Stephen P. Avila
Attorney, Agent, or Firm—Hill, Van Santen, Steadman & Simpson

[57] ABSTRACT

A portable light weight robot arm assembly similating shoulder, elbow, and wrist movements of a human arm, plus extensions of the upper arm and forearm, accurately positions and holds a power tool for performing driving, drilling, chipping, lifting and the like operations at a work-site. The assembly is self contained having a base easily and quickly mounted on a conventional truck or on the ground at the work-site, a carriage shiftable longitudinally and transversely on the base, an upright pedestal tiltable in all planes relative to the base, an extensible boom or upper arm rotatably and swingably mounted on the pedestal, and an extensible power tool suspension arm or forearm pivoted to the upper arm. Hydraulic jacks control the lowering, raising, and extension of the boom, the tilting of the pedestal, the positioning of the carriage, the extension and positioning of the forearm, and the position of the tool. An hydraulic motor controls the rotation of the pedestal and a hydraulic motor can also operate a winch on the boom. The jacks and motor are selectively activated from a portable station, such as a hand held switch unit, permitting freedom of movement of the operator to best observe the work. The upper arm is swung and tiltable about its shoulder on the pedestal and extended or retracted to position its outer end or elbow. The forearm is suspended on the elbow to position the tool, extended to load the tool, and the tool is held by the wrist end of the forearm in its desired position on the work.

30 Claims, 17 Drawing Figures

ROBOT ARM

FIELD OF THE INVENTION

This invention relates to mechanical arms or boom assemblies for accurately suspending power tools such as drills, jack hammers, and the like. Specifically this invention relates to a portable truck or ground mounted robot arm assembly performing functions simulating the use functions of a human arm and accurately positioning and securing a power tool to best perform its function at a work site.

THE PRIOR ART

In my prior U.S. Pat. No. 4,130,168, issued Dec. 19, 1978, I have disclosed a self contained portable extensible boom assembly adapted to be mounted on the open top box body of a truck to exert a downcrowding load on a jack hammer or drill. The boom was powered to swing downwardly with the tool as it penetrated the ground and attempted to hold the tool in an upright position by changing the length of the boom as it was swung over the work. This "squaring of the arc" movement of the tool suspension end of the boom and the downcrowding loads that had to be applied to the boom for advancing the power tool required mechanisms adding expense to the assembly and creating problems in operation.

It would therefore be an improvement in this art to avoid the use of the heretofore required down powered swinging and extending or retracting of the boom providing a tool suspension member that must move during operation of the tool and to provide a boom assembly which similates shoulder, elbow and wrist movements of the human arm plus extension of the upper arm and forearm, to accurately hold and lock a suspended power tool in its desired operating position relative to the work while downcrowding the tool as desired.

It would be a further improvement in this art to simplify heretofore known boom pedestal suspensions and to control all operation from a portable station permitting the operator to closely observe and immediately change the working operations.

SUMMARY OF THE INVENTION

According to this invention there is now provided a self contained, portable, relatively light weight robot arm or boom assembly adapted to be mounted on a conventional truck body or on the ground at the work site to accurately and fixedly suspend a power tool, such as a drill or jack hammer, in its elected work position while controlling this position from a portable unit permitting the operator to closely observe the operation and make adjustments or changes as needed. The portable control unit can function through an umbilical cord or through radio waves. The operator can therefore stand immediately adjacent the jack hammer or driving tool, closely observe the driving or drilling operation and quickly change the positions of the driving tool to best fit work conditions as they progress.

The attitude of the upright pedestal relative to the base can be automatically controlled to remain in a straight vertical position and can be manually controlled from this position. The maintenance of a vertical pedestal position accommodates wide variations in the level of the truck or base support on which the assembly is mounted. The tilting of the pedestal shifts the pivot anchor of the boom increasing its swinging range and attitude.

The suspended forearm of the boom assembly can be easily anchored to resist torque loads and extended to exert downcrowding loads on the tool.

The telescopic boom accommodates extension of the upper arm to the "elbow" while the forearm is also extensible beyond the elbow. The "wrist" connection between the end of the forearm and the tool accommodates control of variations in the relative positioning of the tool and forearm.

It is then an object of this invention to provide a robot arm assembly for a power tool having movements similating shoulder, elbow, and wrist movements of a human arm and also having extensible upper and forearms.

A feature of the invention is the provision of a boom assembly controlled from a portable station permitting the operator to closely observe and control the progress of the work.

Another object of the invention is to provide a self contained portable light weight robot arm assembly for power tools which is easily mounted on a conventional truck, has a pivot shoulder shiftable laterally and transversely, an extensible upper arm on the shoulder, an elbow on the end of the upper arm, an extensible forearm on the elbow, and a wrist on the end of the forearm mounting a power tool.

A further object of this invention is to provide a self contained hydraulic portable downcrowder for power tools.

Another object of this invention is to provide a robot arm for mounting a driving tool at a work site to position the tool relatively to the work, to advance the tool as work progresses and to maintain a downcrowding load on the tool.

Other and further objects of this invention will be apparent to those skilled in the art from the showings on the drawings and the following descriptions.

AS SHOWN ON THE DRAWINGS

Figures 1, 11, 12:
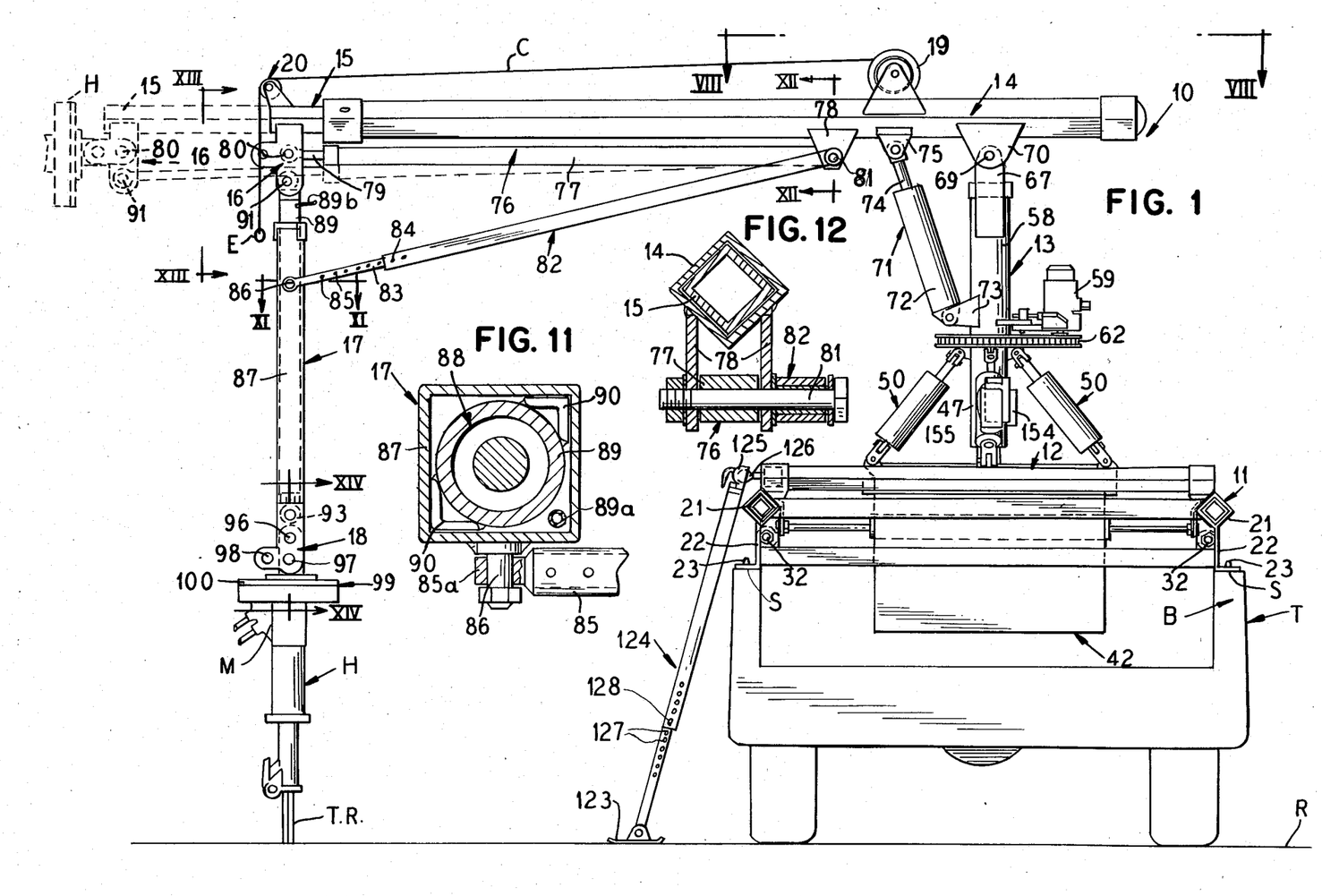
FIG. 1 is an elevational view of a robot arm assembly of this invention mounted on the box body of a pick up truck viewed from the rear.
FIG. 11 is a transverse cross-sectional view along the line XI—XI of FIG. 1.
FIG. 12 is a cross-sectional view along the line XII—XII of FIG. 1.

In FIG. 1, the reference numeral 10 designates generally a robot arm assembly having a base 11 mounted on top of the side walls S of an open top box body B of a pick up truck T. The base 11 supports a carriage 12 movable both longitudinally and transversely on the base. An upright pedestal 13 is mounted for universal movement in all directions on the carriage 12 and projects upwardly from the carriage. A boom or upper arm 14 is provided on top of the pedestal 13. An extension arm 15 is telescoped in the boom 14. The forward end of this arm 15 carries an elbow member 16 from which a forearm assembly 17 is suspended. A wrist member 18 on the forearm 17 has a jack hammer H mounted thereon.

A hydraulic motor driven winch 19 is mounted on top of the boom 14 and a pulley 20 is mounted on top of the extension arm 15 adjacent the end thereof. A cable C from the winch 19 is trained over the pulley 20. The forward end of the cable C has an eye member E or other connection member secured thereon for attachment to a load to be pulled or lifted.

As shown in FIGS. 1, and 7–9, the base 11 is an open rectangle frame with a pair of square tubes 21 extending longitudinally over the tops of the sides S of the truck body B and having brackets 22 on the ends thereof resting on the tops of the sides S and releasably bolted thereto as by means of bolts 23. Upper transverse bars 24 and lower transverse bars 25 span the space between the brackets 22 and are secured thereto thereby completing the open rectangular frame. Vertical plates 26 secure the bars 24 and 25 together in fixed vertically spaced relation.

Figure 9:
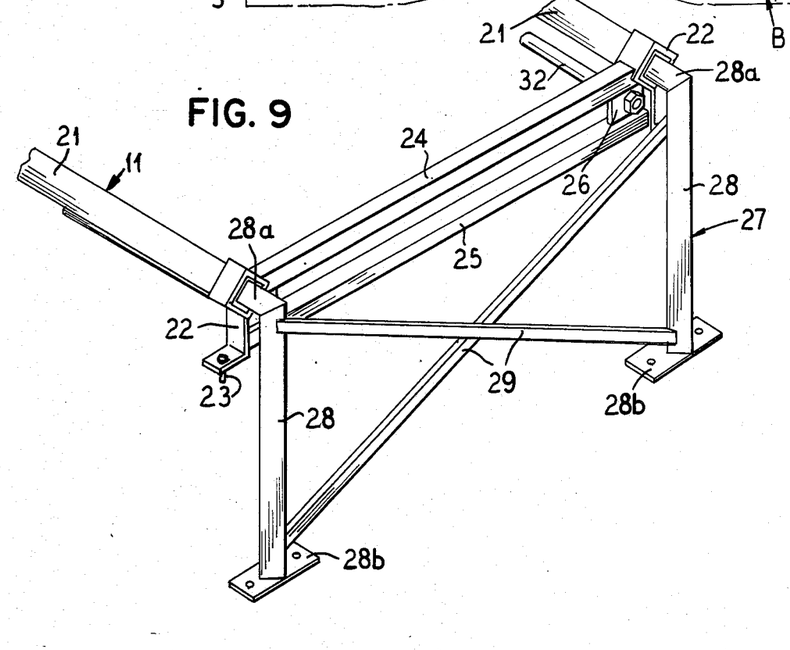
FIG. 9 is a fragmentary perspective view of a mounting frame for the base of the robot arm assembly.
Figure 13:
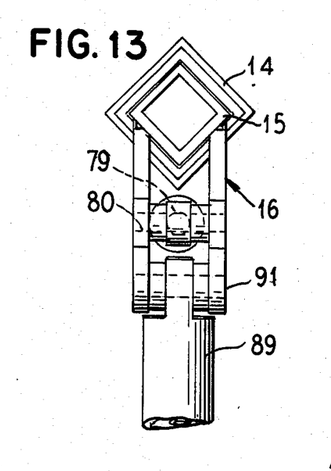
FIG. 13.is an end elevational view along the line XIII—XIII of FIG. 1.

As shown in FIG. 9, instead of mounting the rectangular base 11 on top of the sides S of the truck body B, this base can be supported on end frames 27 each having a pair of legs 28 connected by diagonal struts 29 with lugs 28a on the top of the legs projecting into the ends of the longitudinal frame tubes 21. Each end frame 27 is thus easily attached to the base 11 to support it above ground and the bottom ends of the legs 28 can have mounting plates 28b so that the legs can, for example, be bolted to the bottom bed of a truck body or anchored to the ground.

Longitudinal hydraulic jacks 30 have cylinders 31 with piston rods 32 extending from both ends thereof and secured at their outboard ends to the plates 26 extending between the transverse end bars 24 and 25 as illustrated, for example, in FIG. 9. The cylinders 31 are fixedly suspended from sleeves 33 slidable on the longitudinal side tubes 21 of the base.

The ends of the sleeves 33 have brackets 35 mounting square tubes 36 spanning the space between the sleeves 33. A platform plate 37 has rails 38 riding on these tube members 36.

A transverse hydraulic jack 39 has the cylinder 40 thereof suspended from the platform 37 with piston rods 41 projecting from both ends of the cylinder 39 secured at their ends to the sleeves 33.

Thus, the base 11 has an open rectangular frame fixed to a truck body by brackets 22 or receiving end leg frames 27. The base 11 slidably mounts a longitudinally shiftable track assembly which in turn slidably mounts a transversely shiftable platform 37. Longitudinally extending hydraulic jacks 30 and a transverse extending hydraulic jack 39 shift the platform longitudinally and transversely relative to the base 11.

Figures 7, 10:
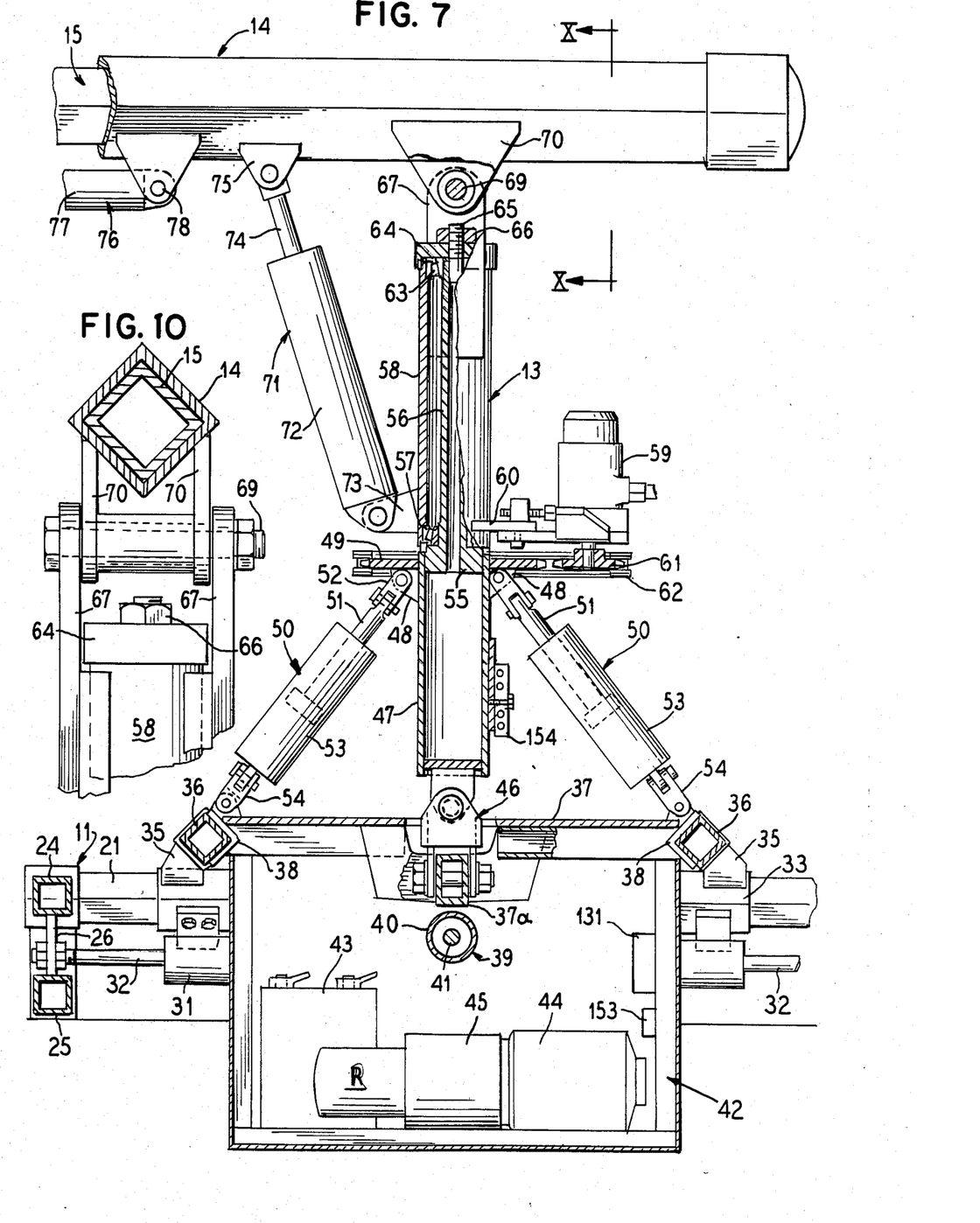
FIG. 7 is a fragmentary view similar to FIG. 1, enlarged to show details and with some parts in vertical section.
FIG. 10 is a cross-sectional view, with parts in elevation, along the line X—X of FIG. 7.
Figure 8:
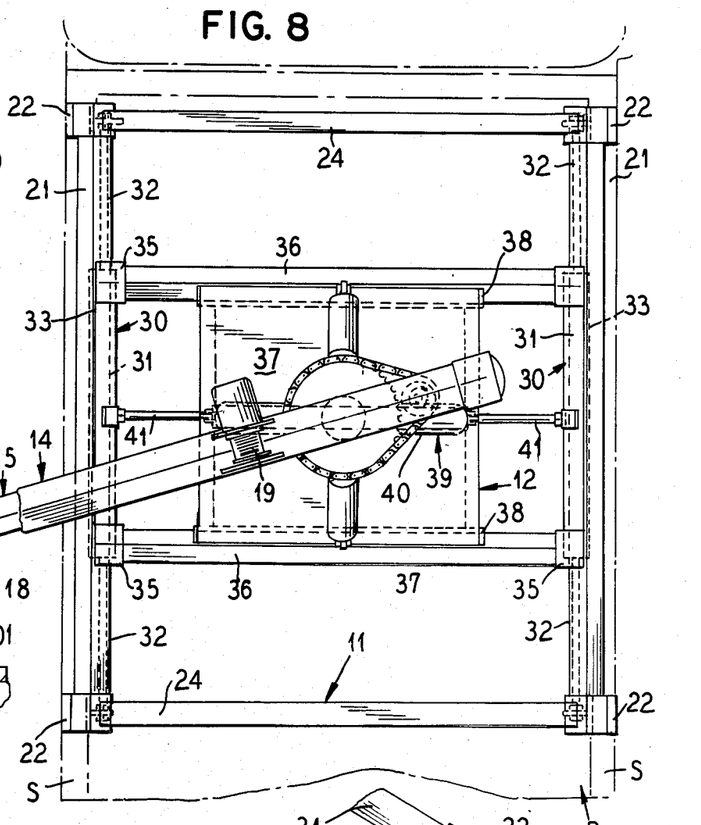
FIG. 8 is a fragmentary plan view along the line VIII—VIII of FIG. 1.

As shown in FIG. 7, the platform 37 suspends a box 42 in which are mounted a battery 43, an electric motor 44 and a hydraulic pump 45 with a reservoir R for hydraulic fluid. The battery energizes the motor, the motor drives the pump and hydraulic fluid is pumped to the jacks and motors. Instead of using the battery as an energy source, electric current can be supplied from the electrical system of the truck T or from any other source of, say, 12 volt current. This box 42 is clear to move with the platform 37 in both transverse and longitudinal directions along the truck body B.

The platform 37, as shown in FIG. 7, has a central opening with a reinforced frame beam 37a therebelow mounting a universal joint 46 to which is pivoted a bottom tube 47 of the pedestal 13. The universal joint 46 permits tilting of this tube 47 in all planes.

The upper end of the tube 47 has four lugs spaced equally therearound underlying a sprocket 49 radiating from the tube. Four hydraulic jacks 50 surround the tube 47 and have piston rods 51 connected through universal joints 52 to the lugs 48. The cylinders 53 of the jacks are connected through universal joints 54 to the platform 37. These jacks 50 can tilt the tube 47 relative to the platform 37 in all planes.

The upper end of the tube 47 has a plug 55 fixed in the mouth thereof with an integral upstanding central tubular stem 56 projecting therefrom. The plug supports a roller thrust bearing 57 carrying a rotatable upper tube or sleeve 58 of the pedestal 13. A hydraulic motor 59 is fixedly mounted on the sleeve 58 extending radially therefrom on a bracket 60 and driving a sprocket 61. A chain 62 connects the sprocket 61 with the sprocket 49 so that when the motor 59 is driven it will rotate around the bottom tube 47 carrying the sleeve 58 therewith so that the pedestal 13 has a rotating upper portion.

The upper end of the plug stem 56 mounts a thrust bearing 63 and a cap 64 is supported on this bearing. A stud 65 secured in the upper end of the stem 56 receives a nut 66 therearound so that the sleeve 58 is held against axial shifting relative to the plug 55 and its upstanding stem 56, but is free to rotate around this stem.

A pair of ears or lugs 67 are secured to opposite sides of the sleeve 58 and extend thereabove to mount a transverse pivot 69 pinned to depending ears 70 of the boom 14. The boom is thus free to swing in a vertical plane on the pedestal and to rotate in a horizontal plane with the sleeve 58 of the pedestal 13.

A hydraulic jack 71 has the cylinder 72 thereof pivoted at its bottom end to a bracket 73 mounted on the sleeve 58 of the pedestal and has its piston rod 74 projecting from the cylinder 72 and pinned to a bracket 75 depending from the boom 14 forwardly from the pivot pin 69 and in alignment therewith. This jack 71 swings the boom 14 about its pivot 69.

A hydraulic jack 76 underlies the boom 14 and has its cylinder 77 pivoted at its rear end to a bracket 78 depending from the boom 14 forwardly of the bracket 75 for the jack 71. The cylinder 77 of this jack 76 is substantially elongated and extends parallel under the boom 14 to the front end thereof where its piston rod 79 is pinned at 80 to the elbow 16 depending from the telescoping arm 15. The cylinder 76 thus extends and retracts the arm 15 out of and into the boom 14.

As shown in FIG. 12, the bracket 78 on which the rear end of the jack cylinder 77 is pivoted has the pivot pin 81 extending laterally therefrom and mounting the rear end of a telecoped strut tube 82. This tube 82 has an extensible rod portion 83 telescoped therein and locked in extended position by a pin 84 selectively seated in one of the plurality of holes 85 extending therethrough.

As shown in FIG. 1, the forward end of this extensible rod 83 is pinned at 86 to the outer casing 87 of the forearm 17. As shown in FIG. 11, this casing 87 is a square tube with a laterally projecting pin 86 swingably receiving an eye end 85a of the rod 85. The tube casing 87 houses a hydraulic jack 88, the cylinder 89 of which has angle bracket shoes 90 welded to opposite sides thereof to slide in the corners of the casing 87 thereby preventing relative rotation of the casing and cylinder. The cylinder 89 projects above the casing 87 and is pinned to the elbow 16 as shown at 91. Spaces are provided in the casing 87 alongside the cylinder 89 through which a fluid conveying hose 89a to the bottom of the cylinder fits freely. The fluid hose 89b to the top of the cylinder need not extend into these spaces because the top of the cylinder remains above the top of the casing 87.

Figure 14:
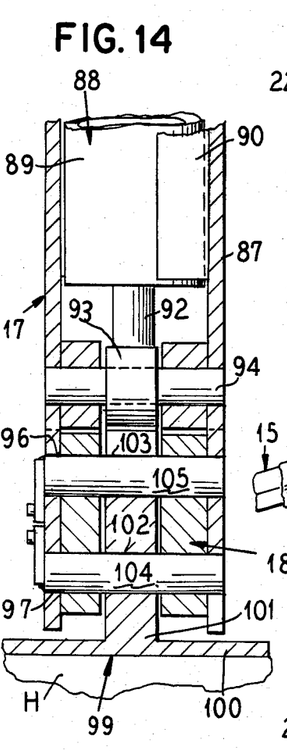
FIG. 14 is a vertical sectional view along the line XIV—XIV of FIG. 1.
Figure 15:
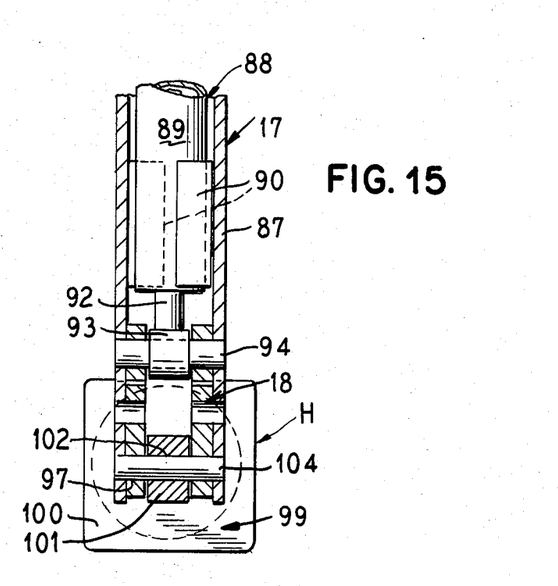
FIG. 15 is an end elevational view along the line XV—XV of FIG. 4.

As shown in FIGS. 14 and 15 the lower end of the cylinder 89 of the jack 88 has its piston rod 92 depending therefrom with an eye end 93 receiving a pin 94 connecting the square tube casing 87 with the piston rod so that the casing will be powered or downcrowded by the jack relative to the elbow 16.

Figure 4:
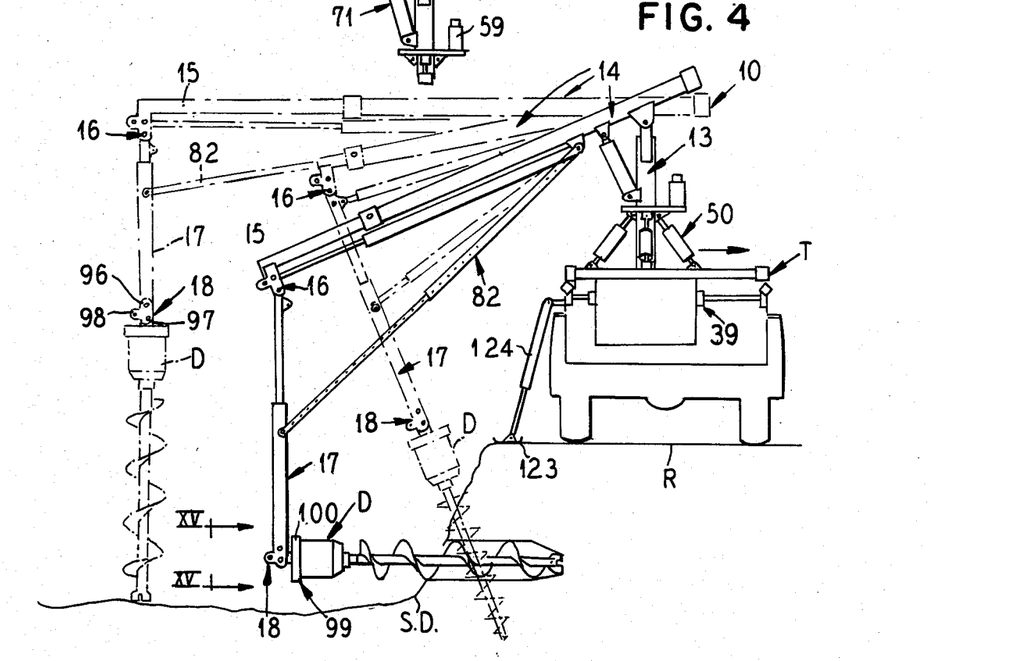
FIG. 4 is a view similar to FIG. 3 showing the manner in which the robot arm assembly suspends and downcrowds a power drill.

The wrist mounting 18 is welded to the bottom end of the tube 87 and includes a pair of L-shaped lugs each with three pin holes for suspending the power tool H or D either in vertical alignment with the forearm 17 as shown in FIG. 1 or right angles to the forearm as shown in FIG. 4. The L-shaped wrist 18 has a vertical leg with top pin holes 96, and bottom pin holes 97, and with the horizontal leg having pin holes 98 laterally displaced from the holes 97.

The power tools such as the jack hammer H or the drill D are attached to the wrist 18 by a mounting member 99 which has a base plate 100 for bolting to the top end of the tool. This plate 100 has a stem or lug 101 as shown in FIGS. 14 and 15, with two superimposed holes 102 and 103 therethrough. Mounting pins 104 and 105 extend through these holes and through the holes 96 and 97 in the vertical leg of the wrist 18. The tool H is thus fixedly secured to the bottom of the arm 17 and cannot swing from its vertical aligned position therewith. However, when it is desired to mount the tool, such as the drill D, in right angled relation relative to the arm 17, the top pin 105 is removed, and the tool mounting 99 is swung on the pin 104 to register the hole 103 with the hole 98. The pin 105 is then reinserted and the power tool, such as the drill D, is fixedly held in right angled relation to the arm 17 as shown in FIG. 4.

Figure 6:
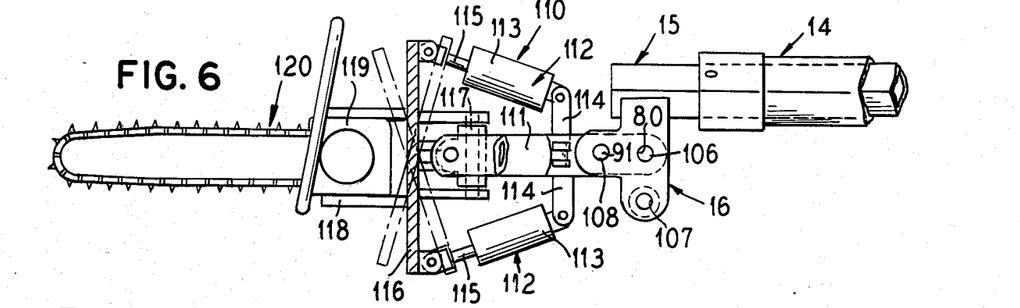
FIG. 6 is a fragmentary elevational view illustrating the manner in which the robot arm supports and directs a chain saw.

As shown in FIG. 6, the elbow 16, like the wrist 18, is formed with a pair of spaced ears or lugs welded to the end of the boom arm 15. These lugs have a leg at right angles to the arm 15 and a leg extending laterally. The first leg has pin holes 106 and 107. The lateral leg has pin holes 108. These holes selectively receive the pins 80 and 91. The forearm 17, as shown in FIG. 1, suspended by the pin 91 from the bottom holes 107, can be removed from the extensible upper arm 15 by removing the pin 91 and uncoupling the extensible strut tube 85 from its pin 86. Then, as illustrated in FIG. 6, a supplemental wrist attachment 110 can be mounted on the elbow 16. This attachment has a body member 111 with pin holes adapted to register with the holes 106, 108 of the elbow 16 whereupon insertion of these pins in these holes will lock the body to project forwardly from the boom arm 15. Four hydraulic jacks 112 have the cylinders 113 thereof pivoted to ears 114 radiating from the body member 111 and the piston rods 115 of the jacks project from the other ends of the cylinders and are pivotally pinned to a plate 116 which is connected to the body member 11 by a universal joint 117. The hydraulic jacks 112 are disposed in circumferentially and equally spaced relation around the body member 111 so that the plate 116 can tilt in all planes.

The plate 116 has a forwardly projecting pocket 118 receiving the motor casing end 119 of a chain saw 120.

Thus the boom arm 15 can be positioned to present the chain saw 120 at a desired work site and the hydraulic jacks 112 can be manipulated to direct the saw against the work.

Figures 3, 5:
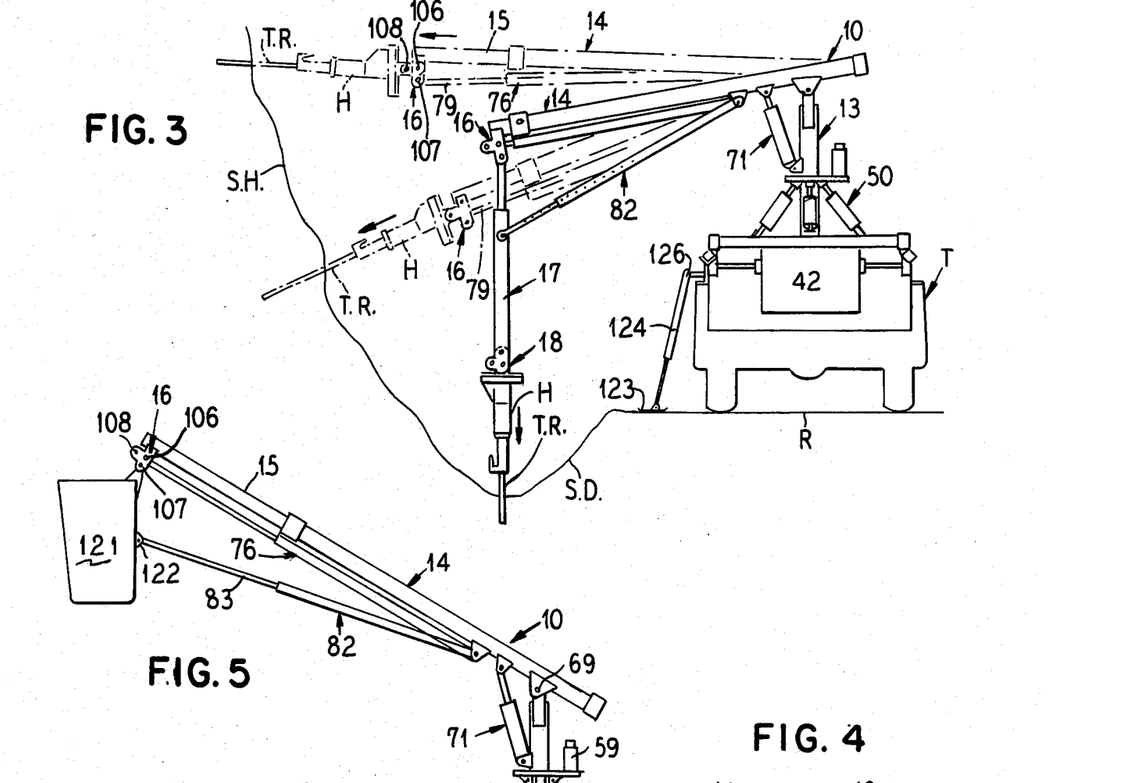
FIG. 3 is a view similar to FIG. 1 showing the manner in which the robot arm suspends and downcrowds a jack hammer in various positions alongside a road bed.
FIG. 5 is a fragmental view similar to FIGS. 3 and 4 showing the manner in which the robot arm carries a platform basket to support a workman at an elevated work site.

As illustrated in FIG. 5, a bucket platform 121 can also be mounted on the elbow 16 for example by a pin inserted through the bottom pin hole 107 and the bucket 121 can be held against swinging relative to the boom arm 15 by the extensible strut 82 having its extended end 83 pinned at 122 to the bucket. Thus, the robot arm of this invention is also useful to carry a workman to a desired work site.

As illustrated in FIG. 1, the jack hammer H is fixedly suspended from the wrist 18 of the forearm 17 to project axially from the forearm. The forearm in turn is fixedly suspended from the elbow 16 carried by the upper boom arm 15. The telescoping strut assembly 82 is adjusted so that the forearm 17 is at right angles to the boom arm 15.

The truck T in FIG. 1 is illustrated as being in a level position on a roadbed R with the pedestal 13 in vertical position and the boom 14 extending horizontally and transversely of the truck. The jack hammer H is then downcrowded to act against the roadbed R by the hydraulic jack 88. The tool rod T.R. suspended from the jack hammer H is thus pressed against the work. The jack hammer H has a motor M in its upper end for delivering reciprocating hammer blows to the tool. It will be understood that the elbow 16 can be accurately positioned by manipulation of the boom 14 and the extension or retraction of the boom arm 15 holds the jack hammer H at its work site and then advanced as work progresses as by swinging of the boom. Very effective downcrowding loads are established.

Figure 2:
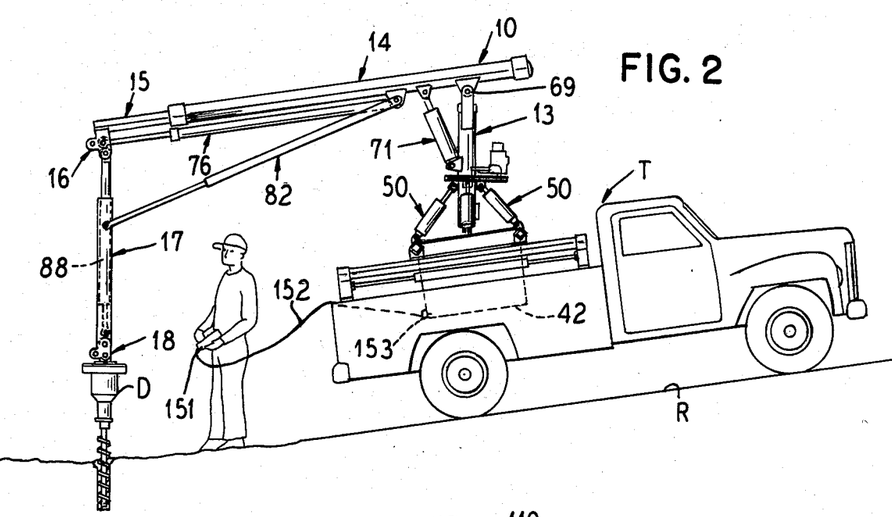
FIG. 2 is a side view of the assembly of FIG. 1 showing the truck in inclined position on a hill.

In FIG. 2 the truck T is shown in an upwardly inclined position on the roadbed R with the robot arm assembly swung to project from the rear end of the truck body for mounting and downcrowding a drill or auger D to drill a hole in the roadbed. The pedestal 13 is tilted relative to the truck by manipulation of the hydraulic jacks 50 so that it will be in the same vertical plane as when the truck is on level ground as illustrated in FIG. 1. This maintenance of the vertical attitude of the pedestal 13 keeps the pivot pin 69 mounting the boom arm 14 in a horizontal plane so that raising and lowering of the boom will be in a vertical plane. The elbow 16 is thus accurately positioned directly over the spot to be drilled and the downcrowding cylinder 88 in the forearm 17 forces the drill D into the ground as the drilling progresses. Torque created by the drilling operation is anchored by the shoes 90 riding in the corners of the square arm 17 as shown in FIG. 11 thus preventing the jack 88 from rotating and by the strut tube 82 which stiffens the forearm 17 against twisting.

FIG. 3 illustrates another use of the robot arm assembly 10 where the truck T rests on a roadbed R alongside a side ditch S.D. and an elevated side hill S.H. In this illustration the boom 14 extends laterally from the side of the truck T and is illustrated in several tilted positions. As shown in solid lines, the jack hammer H can be suspended from the wrist 18 of the downcrowding forearm 17 and lowered into the ditch S.D. to drive the tool TR below the grade of the roadbed R. Then the forearm 17 can be removed from the elbow 16 as described above and the jack hammer H can be fixedly mounted on the elbow 16 to project forwardly from the boom 14 to present the tool TR to the side of the hill S.H. at a level below the top of the pedestal 13. To accommodate the fixed mounting of the hammer H on the elbow 16, the piston rod 79 of the jack 76 is connected to the lower elbow holes 107 so that the pins 80 and 91 can be seated in the pin holes 106 and 108. Then, the boom can be raised to carry the jack hammer H to a level above the pedestal 13 for driving the tool into the hillside S.H. substantially above the roadbed R.

The downcrowding loads on the jack hammer H connected directly to the elbow 16 is applied by the cylinder 76 which extends the boom arm 15.

FIG. 4, like FIGS. 1 and 3, shows the boom arm 14 extending laterally of the truck T and illustrates several positions for anchoring and downcrowding a power drill D for operations below and under the roadbed R. In the solid line position of the boom 14, the forearm 17 is swingably suspended from the elbow 16 to depend vertically. It is held against swinging by the strut tube 82. The wrist 18 at the bottom of the forearm 17 locks the drill D at right angles to the forearm 17 in a horizontal position substantially parallel to the roadbed R for drilling a hole under the roadbed. To advance the drill D, the hydraulic jack 39 (FIG. 8) is activated to advance the pedestal carriage 37 in the direction of the drilling. During the advancement, the drill D is accurately held and locked in its selected attitude.

As shown in dotted lines in FIG. 4, the drill D may also be locked on the wrist 18 forwardly from the forearm 17 and the boom 14 tilted to present the drill D to the desired spot in the ditch S.D.

As shown in FIGS. 1, 3 and 4, the truck body B may be braced again tilting to the side on which the boom extends especially during lifting or pulling operations, by means of a shoe or foot 123 pivoted on the end of an extensible tube 124 with a ball cup 125 at its upper end embracing a ball 126 on the base frame 11. The ball is secured to the central portion of the platform frame. The tube 124, like the tube 82, has a row of holes 127 to selectively receive a pin 128 for controlling the length of the tube.

Figure 16:
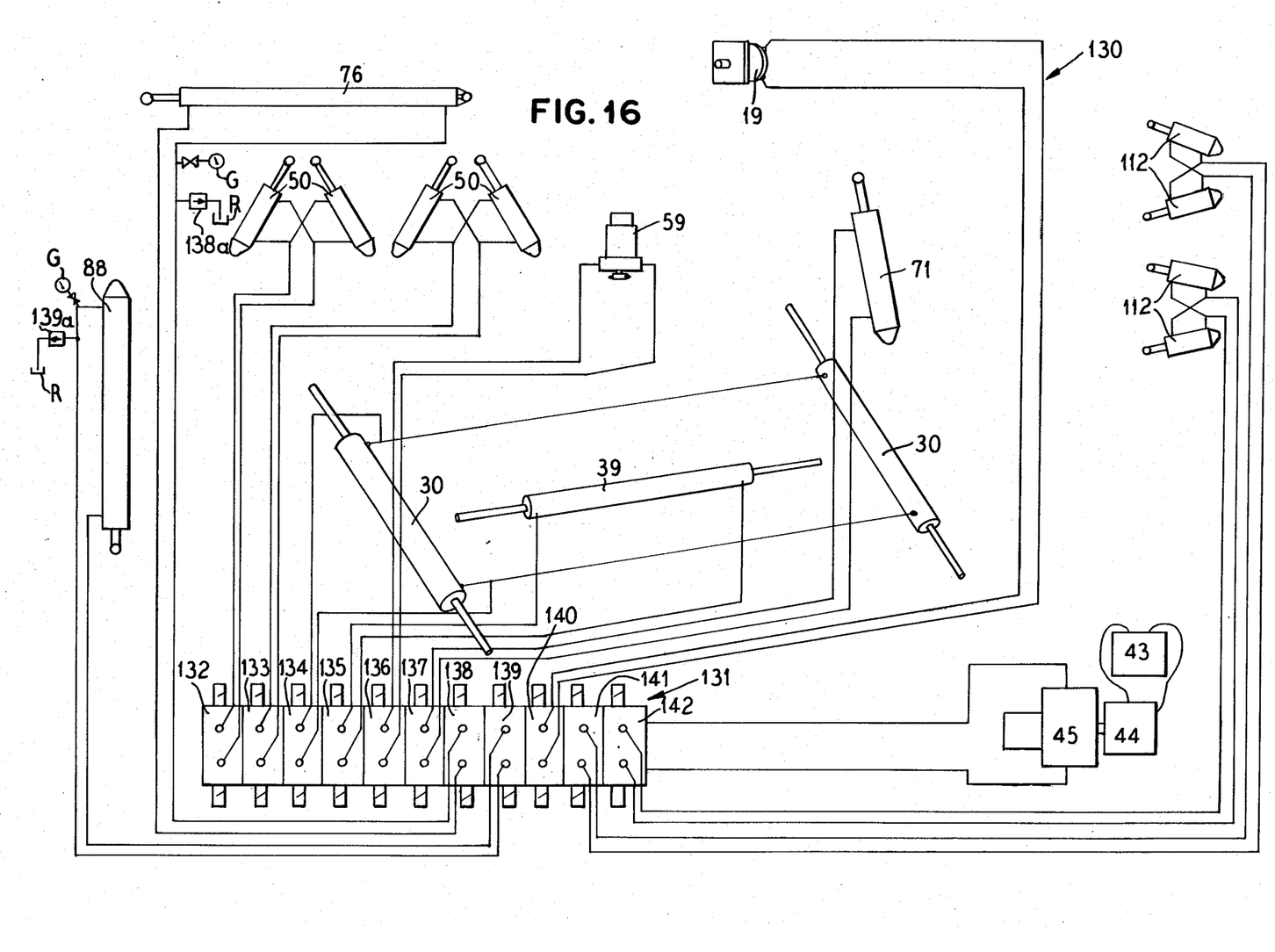
FIG. 16 is a schematic diagram of the hydraulic system for the jacks and motors of the robot arm.

As shown in FIG. 16, a hydraulic circuit 130 of tubing and hoses connects the electric motor driven hydraulic pump 45 with all of the jacks and hydraulic motors of the robot arm assembly through a bank 131 of solenoid actuated three position valves 132–142 which are housed in the box 42 suspended from the platform 37. Each valve controls fluid flow to and from the jacks and locks fluid therein under the control of electrically energized solenoids. Each valve 131–142 is illustrated as having solenoids at opposite ends thereof for driving the valve spool therein.

As illustrated, the four jacks 50 for controlling the tilting of the pedestal 13 operate in two pairs of opposite jacks, one pair being controlled from the valve 132 and the other pair controlled from the valve 133. When fluid is directed from the valve 132 to extend the piston rod of one of the jacks of the pair, the opposite jack will receive and drain fluid in the opposite direction so that its piston rod can retract. The same control is provided for the other pair of jacks 50 by the valve 133. Tilting of the pedestal in all planes is thus accommodated.

The valve 134 controls fluid flow to and from the pair of jacks 30 driving the platform 137 longitudinally of the base 11 as explained above. The valve 135 controls the fluid flow to and from the jack 39 controlling the transverse movement of the platform 37. The valve 136 controls fluid flow through the pedestal rotating hydraulic motor 59. The valve 137 controls fluid flow to and from the boom tilting jack 71. The valve 138 controls fluid flow to and from the telescoping arm jack 76. The valve 139 controls fluid flow to and from the downcrowding jack 88. The valve 140 controls flow through the winch motor 19. The valve 141 controls fluid flow to and from one pair of opposite wrist jacks 112 while the valve 142 controls fluid flow to and from the opposite pair of wrist jacks 112.

The line from the valve 139 to the top of the jack 88 has an adjustable pressure regulating device 139a to control the downcrowding load on the jack to meet operating conditions. The device bleeds fluid back to the tank of the pump 45 so that the load on the jack hammer tool H or the drill D can be selected for the best operation of the tool. The controlled fluid pressure is shown by a gauge G. A similar device 138a can be provided in the line from the value 138 to the jack 78 to regulate the downcrowding load when the power tool is mounted directly on the elbow 16.

Figure 17:
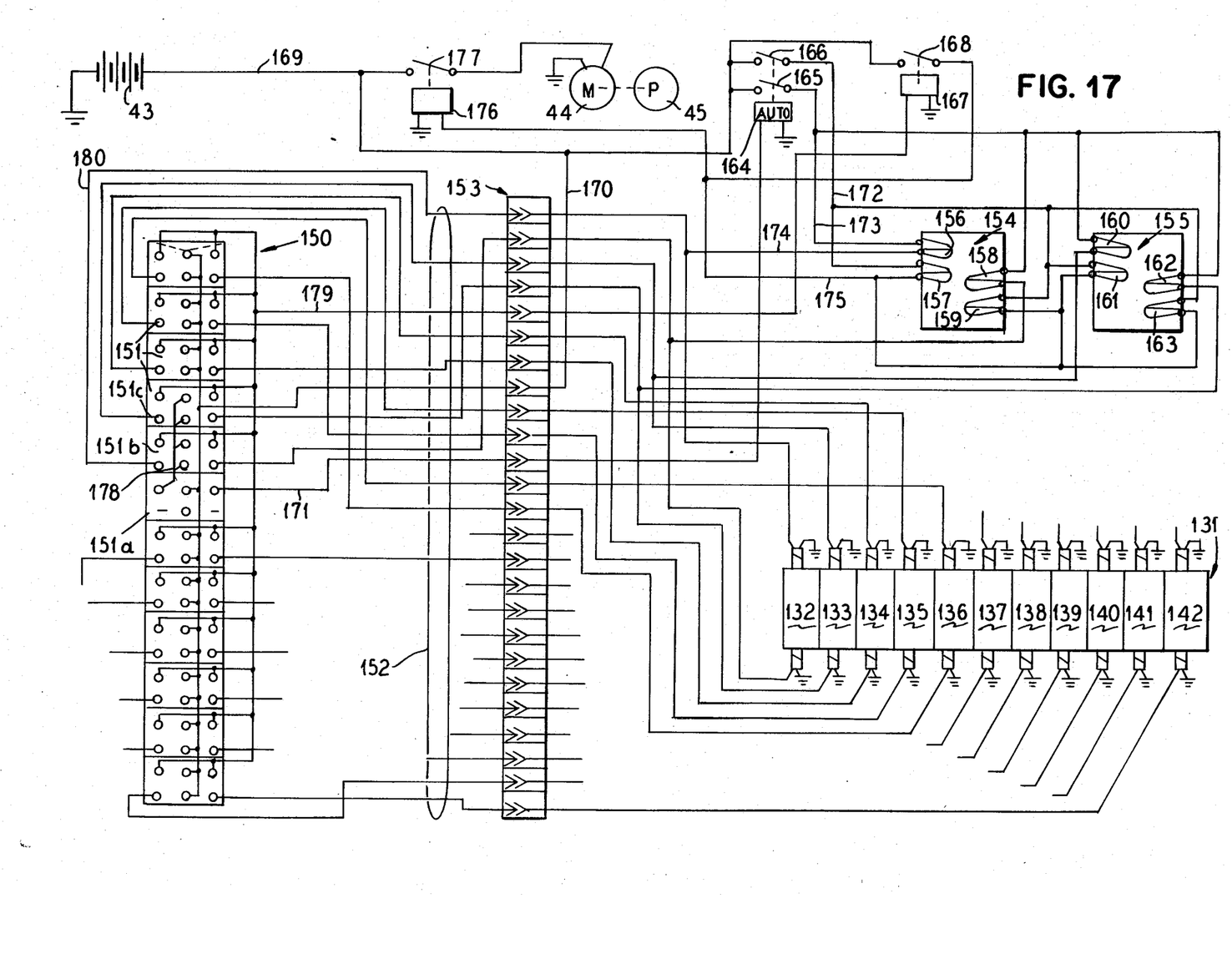
FIG. 17 is a schematic diagram of the electrical system for the robot arm.

FIG. 17 is an electrical diagram illustrating the control for the solenoids of the hydraulic valves 132–142 of FIG. 16 and shows how a hand held control box operates through an umbilical cord for starting the pump driving motor 44 and for causing the hydraulic motors and jacks to perform their functions.

As shown in FIG. 17, a hand held control box 150 of center powered rocker switches 151 is connected through an umbilical cord 152 of electric wires to a plug-in receptacle 153 which is conveniently mounted in the box 42 suspended from the platform 47 of the boom assembly (FIG. 7). A pair of blocks 154 and 155 of mercury tilt switches are mounted at a low level on the tube 47 of the pedestal 13 in right angle relation as illustrated in FIGS. 1 and 7. The block 154, as shown in FIG. 17 mounts four mercury tilt switches 156–159. The block 155 at right angles to the block 154 mounts four mercury tilt switches 160–163. These tilt switches are mounted in circuits which can automatically maintain the pedestal 13 in a vertical position regardless of the tilted attitude of the truck T. Thus, the blocks 154 of switches energizes solenoids for the valves controlling hydraulic flow to and from one pair of the jacks 50 while the block 155 contains the mercury switches for controlling the solenoids of the valve feeding hydraulic fluid to and from the other pair of jacks 50.

The automatic tilting of the pedestal 13 can be overridden by a manual control permitting the operator to select any tilt position of the pedestal 13 relative to the truck. The automatic control, as shown in FIG. 17, includes a relay 164 operating a pair of contacts 165 and 166. The manual control includes a relay 167 operating a single contact 168.

A power line 169 from the battery 43 provides power to each of the relay contacts 165 and 166. A branch power line 170 feeds power to all of the switches 151 in the bank 150. One of these switches, shown at 151a, is connected to the relay 164 by a line 171. When this switch 151a is manually depressed to activate the line 171, the relay 164 is energized to close the contacts 165 and 166 thereupon providing power to the mercury switches 156 and 157 through the lines 172 and 173. Then, if the pedestal 13 is in a tilt position closing the mercury switches 156 and 157, power proceeds through line 174 to one of the solenoids of the valve 132 actuating the valve for feeding hydraulic fluid to the appropriate sides of the pistons in one pair of cylinders 50 to achieve leveling of the pedestal. If the attitude of the pedestal is such that the mercury switches 158 and 159 are closed, circuitry energizes the opposite solenoid of the valve 132 to control hydraulic flow to the opposite sides of the pistons in the same pair of cylinders 50.

The second block 155 of mercury switches 160-163 is included in similar circuitry controlling the valve 133 to similarly flow hydraulic fluid to the cylinders of the other pair 50. Thus, if the pedestal is so tilted as to require swinging only in one plane, one bank 154 of the switch will function through the valve 132 whereas if the pedestal is tilted so as to require tilting in two planes to achieve its vertical attitude, the switches to both banks 154 and 155 will function to control the valves 132 and 133.

Closing of the relay contact 166 supplies power to the bottom mercury switches 157, 159, 161 and 163 of the banks 154 and 155 and these switches are powered through a line 175 to a relay 176 operating a contact 177 in the power line 169. When this contact 177 is closed, power is supplied to the motor 44 for driving the pump 45 thereby feeding hydraulic fluid to the valve bank 131.

When the switch 151a is tilted in the opposite direction from that shown in FIG. 17 to close a contact to a line 178, providing power to the switches 151c and 151b, the relay 167 is energized to close the contact 168 thereby supplying power to the relay 176. Then actuating the switch 151b connects power to the relay 167 through line 179 closing the contact 168 providing power to the motor 44 through the contact 177. Also another circuit is closed through line 180 to one solenoid of the valve 132.

The arrangement is such that closing of the switch 151a in one direction will energize relays to power the automatic tilt switches for controlling the fluid flow to the cylinders 50 for maintaining the vertical attitude of the pedestal 13 and when the switch is rocked in the opposite direction, manual circuitry is energized. As shown, adjacent switches 151b and 152c are also tied into the line 178 so that when their rocker arms are manually actuated, the attitude of the pedestal can be manually controlled. Depressing the switch 151b in the opposite direction closes similar circuitry energizing the opposite solenoid of valve 132. Thus, valve 132 is actuated to flow fluid to and from one pair of jacks 50 in a manual mode. The other pair of jacks 50 is similarly controlled from the switch 151c through a circuitry energizing the solenoids of valve 133. The switches 151a-c automatically or manually control the tilting of the pedestal through the valves 132 and 133.

The remaining valves 134 through 142 are independently controlled by the remaining switches 151 through circuitry which energize their solenoids for opening and closing the valves to selectively control hydraulic flow through the remaining jacks and hydraulic motors.

From the above description it will be clear to those skilled in this art that this invention provides a robot arm with many modes of operation accommodating a whole range of power tools to position, lift, hold and downcrowd the tools from a station permitting a single operator to observe and control all operations from a single station such as a hand held switch box.

I claim:

1. A boom assembly controlled from a portable station to hold, accurately position, and downcrowd a powered tool which comprises a base adapted to be mounted on the ground or on a truck, an upstanding rotatable pedestal supported on said base, a boom arm pivoted on said pedestal for swinging in a vertical plane and for rotating with said pedestal to swing in a horizontal plane, an extension arm telescoped in said boom arm, an extendible forearm suspended from said extension arm, a power tool mounting on said forearm, fluid pressure actuated means rotating said pedestal, tilting said boom arm on said pedestal, extending and retracting said extension arm, and extending said forearm to downcrowd the power tool mounting, and a manually actuated unit selectively controlling flow of hydraulic fluid to and from said fluid pressure actuated means.

2. A portable boom assembly for accurately positioning, holding, and downcrowding a power tool to perform its use function which comprises a base adapted to be mounted on the ground or on a truck, a carriage movable longitudinally and transversely on said base, an upright rotatable pedestal tiltably mounted on said carriage, a boom arm pivotally mounted on said pedestal for swinging in a vertical plane and rotatable therewith for swinging in a horizontal plane, an extension arm telescoped in said boom arm, an extensible forearm suspended from said extension arm, a tool mounting on said forearm, fluid pressure means driving said carriage, rotating said pedestal, swinging said boom arm on said pedestal, extending and retracting said extension arm, and extending said forearm to downcrowd the tool mounting, and a single control station actuating said fluid pressure means.

3. A robot arm assembly especially useful for transport to a work site to accurately position, hold, and downcrowd a power tool which comprises a base, an upright pedestal on said base, a telescoped boom assembly pivoted on said pedestal, means for rotating said pedestal to swing said boom assembly, an elbow on the end of said boom assembly, an extensible forearm suspended from said elbow, a wrist on said forearm, a power tool mounting suspended from said wrist, means for fixedly holding the forearm on the elbow, means for fixedly holding the tool mounting on the wrist, a first fluid pressure jack pivoting said boom on said pedestal, a second fluid pressure jack extending and retracting the boom, a third fluid pressure jack extending the forearm, and a strut connecting the suspended forearm to the boom arm.

4. A robot arm assembly for accurately positioning, holding, and downcrowding a power tool which comprises an extensible and retractable boom, a support for one end of said boom, a rotatable and swingable shoulder connection between said support and said boom, an elbow on the extensible end of said boom, an extensible forearm removably mounted on said elbow, a wrist on said forearm, a power tool mounting selectively mounted on said wrist and on said elbow, and means for rotating said shoulder, tilting said boom, extending and retracting said boom, and extending said forearm.

5. A hydraulically actuated robot arm assembly for accurately positioning, holding, and downcrowding a power tool having a base frame, a carriage riding on said base frame, an upright pedestal mounted on said carriage for tilting in all planes and for rotation about its own axis, a telescoped boom pivotally mounted on said pedestal, hyraulically actuated means driving said carriage on said base frame, tilting said pedestal on said carrige, rotating said pedestal, tilting said boom on said pedestal, and extending and retracting the telescoped boom arm, solenoid actuated valves controlling hydraulic flow to and from all of said hydraulic means, an electrical circuit selectively actuating said valves, and a single portable switch unit controlling said circuit.

6. A portable self-contained hydraulically actuated boom assembly for accurately positioning, holding, and downcrowding a power tool and for mounting on a truck or on the ground which comprises a base, an upright pedestal mounted on said base for tilting in all planes and for rotation, a boom pivoted on said pedestal for swinging in a vertical plane, hydraulic jacks mounted on said base controlling the tilting of the pedestal, tilt switches mounted on said pedestal, and hydraulic valves controlled by said tilt switches for maintaining the pedestal in a vertical upright position regardless of the attitude of the base.

7. A portable self-contained hydraulically actuated boom assembly for accurately positioning, holding, and downcrowding a power tool and for mounting on a truck or on the ground which comprises a base frame, a carriage movable longitudinally and transversely on said frame, a battery, an electric motor energized by said battery, a hydraulic pump driven by said motor, and a bank of solenoid actuated hydraulic valves suspended from said carriage, an umbilical cord extending from said bank of valves, a portable switch box on said umbilical cord, an extensible boom pivoted on said pedestal, a forearm suspended from said boom, hydraulic means receiving hydraulic fluid from said bank of valves driving said carriage, tilting said pedestal, rotating said pedestal, tilting said boom, extending and retracting the telescope boom arm, and extending the forearm whereby all operations of the boom assembly are controlled from the switch box.

8. In the boom assembly of claim 1, the added improvement of an adjustable relief valve selectively controlling the fluid pressure in the means for extending said forearm relative to the fluid pressure in the other fluid pressure actuated means.

9. The boom assembly of claim 1 including a wrist connecting the power tool to the forearm and means for securing said wrist in fixed position.

10. The boom assembly of claim 1 including a wrist mounted on the extension arm and hydrualically actuated means controlling the relative position of the wrist on the forearm.

11. The boom assembly of claim 1 including a winch mounted on said boom arm and a cable receiving pulley mounted on said extensible arm for guiding a cable to and from said winch.

12. The portable boom assembly of claim 2 including hydraulic jacks controlling the tilting of said upright rotatable pedestal.

13. The portable boom assembly of claim 12 including tilt switches on the pedestal, solenoid actuated hydraulic valves controlling fluid flow to and from the hydraulic jacks and circuitry connecting the tilt switches and solenoids of the valves whereby the pedestal will be held in a vertical position regardless of the attitude of the carriage.

14. The portable boom assembly of claim 2 including a fluid pressure pump, and a fluid reservoir suspended from said carriage for supplying fluid to and from said fluid pressure means.

15. The boom assembly of claim 2 including demountable end legs for said base to support the base from the ground.

16. The boom assembly of claim 2 including a hydraulic jack mounted on the boom arm having a piston rod selectively pinned to different mountings on the extension arm.

17. The portable boom assembly of claim 2 wherein the extensible forearm includes a square tube slidably supporting a cylindrical hydraulic jack and shoes on the jack cylinder ride inopposed corners of the tube to prevent relative rotation of the square tube and jack.

18. The robot arm assembly of claim 3 wherein the elbow has first and second pin mountings for the second fluid pressure jack.

19. The robot arm assembly of claim 3 wherein the strut is extensible to vary the suspension angle of the forearm.

20. The robot arm assembly of claim 3 wherein the means for rotating said pedestal is a hydraulic motor mounted on the pedestal.

21. The robot arm assembly of claim 3 wherein the base is a carriage mounted on a frame and hydraulic jacks shift said carriage transversely and longitudinally on the frame.

22. The robot arm assembly of claim 4 wherein the elbow has alternate pin mountings for receiving the forearm or the power tool.

23. The robot arm assembly of claim 4 wherein the wrist on the forearm has alternate pin mounting controlling the position of the power tool relative to the forearm.

24. The robot arm assembly of claim 4 wherein the means for rotating the shoulder, tilting the boom, extending and retracting the boom, and extending the forearm are fluid pressure operated from a single control station.

25. The robot arm assembly of claim 5 including an extensible forearm removably suspended from the telescoped boom.

26. The robot arm assembly of claim 5 including an elbow on the telescoped boom and means on said elbow selectively mounting an extensible forearm and a power tool.

27. The boom assembly of claim 6 including an alternate control for tilting said pedestal to override the tilt switches.

28. The boom assembly of claim 7 including a fluid reservoir for said pump.

29. In the boom assembly of claim 1, the added improvement of an adjustable valve selectively controlling the fluid pressure in the means for extending the extension arm.

30. The robot arm assembly of claim 3 wherein the elbow and wrist have alternate mountings for the forearm and power tool mounting.

* * * * *